(12) United States Patent
Rane et al.

(10) Patent No.: US 8,966,277 B2
(45) Date of Patent: Feb. 24, 2015

(54) METHOD FOR AUTHENTICATING AN ENCRYPTION OF BIOMETRIC DATA

(71) Applicant: Mitsubishi Electric Research Laboratories, Inc., Cambridge, MA (US)

(72) Inventors: Shantanu Rane, Cambridge, MA (US); Takashi Ito, Kanagwa (JP)

(73) Assignees: Mitsubishi Electric Research Laboratories, Inc., Cambridge, MA (US); Mitsubishi Electric Corporation, Tokyo (JP)

( * ) Notice: Subject to any disclaimer, the term of this patent is extended or adjusted under 35 U.S.C. 154(b) by 51 days.

(21) Appl. No.: 13/836,457

(22) Filed: Mar. 15, 2013

(65) Prior Publication Data
US 2014/0281567 A1    Sep. 18, 2014

(51) Int. Cl.
G06F 21/00     (2013.01)
G06F 21/32     (2013.01)
H04L 9/00      (2006.01)
H04L 9/32      (2006.01)

(52) U.S. Cl.
CPC ............... *G06F 21/32* (2013.01); *H04L 9/008* (2013.01); *H04L 9/3231* (2013.01)
USPC ............... 713/186; 713/168; 380/28; 380/44; 705/67; 382/117

(58) Field of Classification Search
USPC .......................................................... 713/186
See application file for complete search history.

(56) References Cited

U.S. PATENT DOCUMENTS

2013/0318351 A1\* 11/2013 Hirano et al. ................. 713/168
2014/0247939 A1\*  9/2014 Hattori et al. .................. 380/44

FOREIGN PATENT DOCUMENTS

| EP | 2278750 A1 | 1/2011 |
| EP | 2495901 A1 | 9/2012 |
| WO | 2006054201 A1 | 5/2006 |
| WO | WO2012114452 A1 | 8/2012 |

OTHER PUBLICATIONS

Securing Biometric Data|http://www.merl.com/publications/docs/TR2009-002.pdf|Vetro et al.|pp. 1-18|Apr. 2009.\*
Vetro et al. "Securing Biometric Data TR2009-002," Mitsubishi Research. Apr. 1, 2009. XP055127638.
Hattori, Mitsuhiro. "Provably-Secure Cancelable Biometrics Using 2 DNF Evaluation." Journal of Information Processing, vol. 20. No. 2. 496-507. Apr. 2012.

\* cited by examiner

*Primary Examiner* — Mahfuzur Rahman
(74) *Attorney, Agent, or Firm* — Dirk Brinkman; Gene Vinokur

(57) ABSTRACT

A method authenticates an encryption of a probe vector of biometric data based on an encryption of an enrollment vector of the biometric data using consistency of discriminative elements of the biometric data. The method determines an encryption of a first distance between discriminative elements of an enrollment vector stored at a server and a probe vector presented for an authentication. The method also determines an encryption of a second distance between discriminative elements of a first consistency vector stored at the server and a second consistency vector presented for the authentication. Next, the biometric data is authenticated based on encryptions of the first and the second distances.

9 Claims, 6 Drawing Sheets

100

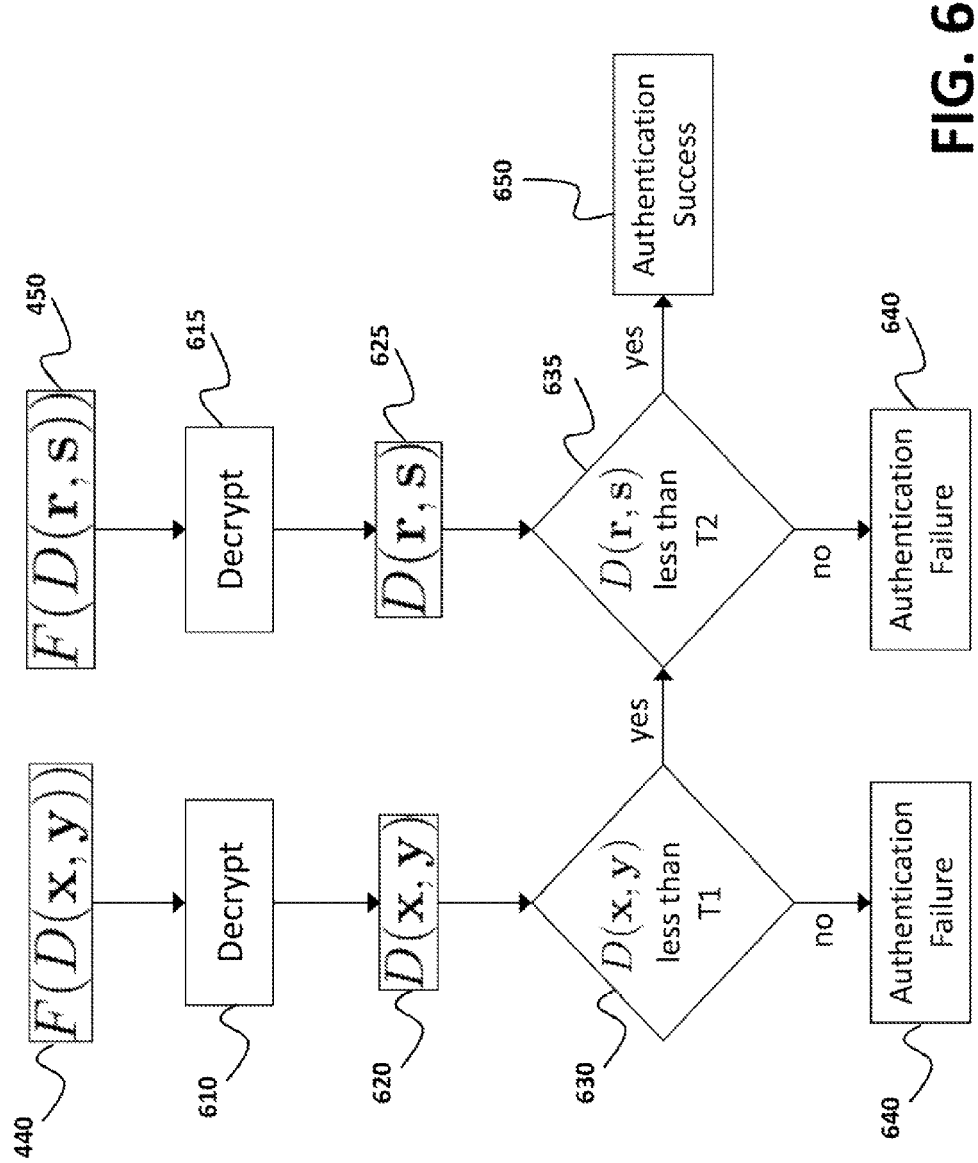

METHOD FOR AUTHENTICATING AN ENCRYPTION OF BIOMETRIC DATA

FIELD OF THE INVENTION

This invention relates generally to secure authentication of a user, and more particularly to authenticating an encryption of biometric data of the user.

BACKGROUND OF THE INVENTION

Biometric authentication performs authentication based on features of a body part, such as a fingerprint, veins, a facial image, and an iris, have been put into practical use. Biometric authentication typically uses an enrolment stage and an authentication stage. During the enrolment stage, the biometric data of users are acquired and stored in a database. During the verification stage, biometric data of a user requesting authentication is compared with the stored biometric data. If there is a match, then the user is allowed access.

One of the considerations for achieving the biometric authentication is whether or not the same features of the biometric data obtained at the enrolment stage may be obtained at the authentication stage. For example, in biometric authentication based on palm veins, high-accuracy authentication can be performed by acquiring and storing features of palm veins of an upper right part of a user's palm at the time of enrolment and acquiring features of palm veins of a lower left part of the palm at the time of authentication. U.S. Pat. No. 8,264,325 describes one method for biometric authentication.

In addition, it can also be required to perform the authentication in a secure manner. For example, the biometric data of enrolled user are often analyzed and stored by a third party. It is important that the private biometric data are not revealed to the third party. Similarly, the privacy of the biometric data presented for the authentication also should be preserved.

It is often required to securely determine a result of a function applied to encrypted signals. For example, a distance between two encrypted signals can be measured using a variety of functions, such as least/weighted squared error, or Hamming distance. In turn, the distances between two signals are widely used for various authentication purposes. This problem is often defined as a secure multiparty computation (SMC). Computationally secure methods, such as oblivious transfer (OT), secure inner product (SIP) can be used as primitives to perform more complicated operations. U.S. patent application Ser. No. 11/005,293 describes such a method.

Accordingly, there is a need for a method authenticating an encryption of biometric data of the user.

SUMMARY OF THE INVENTION

Some embodiments of the invention are based on a realization that discriminative features of the biometric data can be used to assist the authentication. To preserver privacy, in various embodiments, the positions of the discriminable features are encrypted. However, in some situations, the encryption of positions of the discriminable features is not entirely secure. For example, if an adversary generates a large enough number of elements similar to values of legitimate user, then the adversary can be erroneously authenticated.

To minimize a possibility of erroneous authentication, various embodiments utilize the consistency of the discriminative features. In some embodiments, the consistency of the discriminative features is represented by consistency vector, which is a vector of elements with magnitude proportional to probability that the corresponding element in the feature vector remains unchanged across multiple measurements. Such correlation among elements of the feature and consistent vectors is more difficult to be exploited by an adversary in a secure protocol, unlike the location of the discriminative elements of the biometric data.

Some embodiments are based on the following observation. By definition, if $i^{th}$ biometric feature, i.e., the feature corresponding to the $i^{th}$ element extracted from the biometric data of a user (Alice) is discriminable, then that the $i^{th}$ biometric feature can be reproduced in multiple measurements of the biometric data of the user, and have a nearly uniform distribution over its range of values in measurements of most imposters. This means that the consistency $r_i$ of the $i^{th}$ biometric feature for Alice is larger than the consistency of the $i^{th}$ biometric feature for most imposters. Therefore, the distance in consistency can be exploited to prevent the adversary from gaining access.

In various embodiments, the consistency of the $i^{th}$ biometric feature of enrolled user is stored in the encrypted form on the database server. The consistency of the $i^{th}$ biometric feature presented for authentication is determined during the authentication, e.g., by an access control device.

Thus, in addition to comparing, in the encrypted domain, the distance between vectors representing features of the biometric data stored during the enrolment stage and presented for the authentication, various embodiments compare, also in the encrypted domain, the consistency of the discriminative features of the of the biometric data.

Accordingly, one embodiment discloses a method for authenticating an encryption of biometric data, comprising a processor for performing steps of the method. The method includes storing an encryption of an enrolment vector, wherein elements of the enrolment vector include features of the biometric data; storing an encryption of an indicator vector specifying positions of discriminative features of the biometric data; storing an encryption of a first consistency vector of elements with magnitude proportional to probability that corresponding elements in the enrolment vector remain unchanged across multiple measurements; receiving an encryption of a probe vector presented for an authentication of the biometric data; receiving an encryption of a second consistency vector of elements with magnitude proportional to probability that corresponding elements in the probe vector remain unchanged across multiple measurements; determining, in an encrypted domain, an encryption of a first distance between discriminative elements of the enrolment and the probe vectors, wherein positions of the discriminative elements of the enrolment and the probe vectors correspond to the positions of the discriminative features of the user specified by the indicator vector; determining, in the encrypted domain, an encryption of a second distance between discriminative elements of the first and the second consistency vectors, wherein positions of the discriminative elements of the first and the second consistency vectors correspond to the positions of the features of the user specified by the indicator vector; and authenticating the biometric data based on the first and the second distances. The authenticating can include transmitting the encryptions of the first and the second distance to an authentication server.

Another embodiment discloses a method for authenticating an encryption of a probe vector of biometric data based on an encryption of an enrolment vector of the biometric data using consistency of discriminative elements of the biometric data. The method includes determining, in an encrypted domain, an encryption of a first distance between discriminative elements of an enrolment vector stored at a server and a probe vector presented for an authentication; determining, in the encrypted domain, an encryption of a second distance between discriminative elements of a first consistency vector stored at the server and a second consistency vector presented for the authentication; and authenticating the biometric data based on encryptions of the first and the second distances. The steps of the method can be performed by the server using a processor.

Yet another embodiment discloses a system for authenticating biometric data of a user. The system includes a database server for determining, in an encrypted domain, an encryption of a first distance between discriminative elements of an enrolment vector stored at the server and a probe vector presented for an authentication, and for determining, in the encrypted domain, an encryption of a second distance between discriminative elements of a first consistency vector stored at the server and a second consistency vector presented for the authentication; an access control device for determining an encryption of the probe vector and an encryption of the second consistency vector, and for transmitting the encryptions of the probe vector the second consistency vector to the database server; and an authentication server for decrypting the encryptions of the first and the second distances received from the database server, and for authenticating the biometric data based on a comparison of the first and the second distances with at least one threshold.

BRIEF DESCRIPTION OF THE DRAWINGS

FIG. 6 is a block diagram of method for authenticating the biometric data according to an embodiment of the invention.

DETAILED DESCRIPTION OF THE PREFERRED EMBODIMENT

Figure 1:
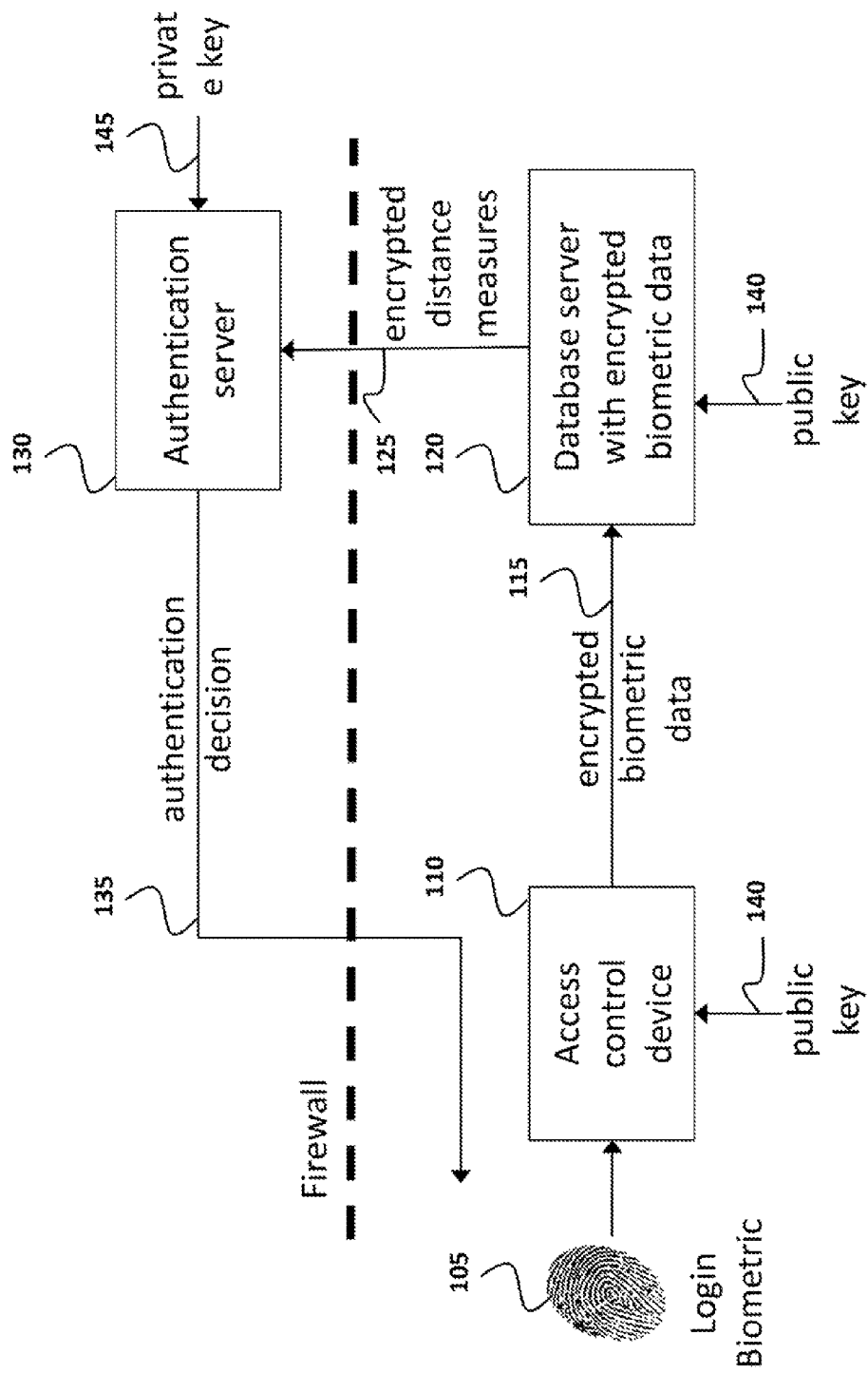
FIG. 1 is a block diagram of method for authenticating an encryption of biometric data of a user according to an embodiment of the invention.

FIG. 1 shows a block diagram of various modules of an authentication method and a system 100 for authenticating an encryption of biometric data 105 according to some embodiments of the invention. Various embodiments of the invention employ one or several modules of the system 100.

The modules can include an access control device 110 acquiring and encrypting with a public key 140 the biometric data 105 of a user who seeks to be authenticated. The access control device transmits the encrypted biometric data 115 to a database server 120. The database server 120 stores user-specific enrolment vectors of the biometric data in encrypted with the public key 140. The elements of the enrolment vector include features of the biometric data.

The server 120 determines distance, in an encrypted domain, between the encrypted biometric data 115 and biometric data stored at the server. The resulted distance 125 is transmitted to an authentication server 130 for rendering the authentication decision 135. The authentication server has access to a private key 145 for decrypting the distances. The public key 140 and the private key 145 are forming a public/private key pair of a homomorphic encryption.

The method and the system preserve privacy by ensuring that the user does not discover any of the biometric data stored in the database. The database and the authentication server do not discover biometric data of the user, and an external adversary impersonating the user cannot discover the feature biometric data stored in the database.

To improve the performance of authentication, some embodiments consider discriminative and consistent features of the biometric data presented for the authentication. To preserve privacy, various embodiments consider the discriminative and consistent features in the encrypted domain. The embodiments improve authentication performance by hiding the location of discriminative and consistent features from the adversary, and not allowing the adversary to leverage the consistent features to gain unauthorized access.

Symbols and Terminology

The mathematical symbols of interest are given in the following table:

| Name | Symbol and expression |
|---|---|
| Probe vector presented at authentication. The elements of the probe vector can include features of the biometric data of a user. The elements can be integers or bits that can be individually encrypted. | $x = (x_1, x_2, \ldots, x_N)$ |
| Enrolment vector securely stored on the database server and used for comparison. Similarly, the elements of the enrolment vector include features of the biometric data and can be integers or bits that can be individually encrypted. | $y = (y_1, y_2, \ldots, y_N)$ |
| An indicator vector specifying positions of discriminative features of the biometric data. The indicator vector can be binary having '1' entries at positions of discriminative features. | $v = (v_1, v_2, \ldots, v_N)$ |
| A first consistency vector specifying consistency of each element of the enrolment vector. This vector can be stored at the server in the encrypted form. Elements of the vector can be integers. | $r = (r_1, r_2, \ldots, r_N)$ |
| A second consistency vector specifying consistency of each element of the probe vector. This vector can be received at the server in the encrypted from a legitimate user or an adversary. | $s = (s_1, s_2, \ldots, s_N)$ |
| Distance between the probe vector presented at authentication and the enrolment vector securely stored on the database server. When the vector elements are integers, this distance represents the square of the Euclidean distance between the vectors. When the vector elements are 0 or 1, this represents the Hamming distance between the vectors. Other distance measures are possible | $d(x, y) = \sum_{i=1}^{N}(x_i - y_i)^2.$ |
| Distance between the discriminative elements of probe and enrolment vectors. | $D(x, y) = \sum_{i=1}^{N} v_i (x_i - y_i)^2$ |

-continued

| Name | Symbol and expression |
|---|---|
| Distance between the discriminative elements of the first and the second consistency vectors. | $D(r, s) = \sum_{i=1}^{N} v_i(r_i - s_i)^2$ |
| Encryption function having quadratic homomorphic properties allowing at least one multiplication and a large number of additions. | $e(E(a), E(b)) = F(ab)$<br>$F(ab)F(cd) = F(ab + cd)$ |

Performance Measures

In some embodiments, the performance of an authentication system is measured using the following metrics:
1. Probability of false rejection, or false rejection rate (FRR). This is the probability that, given a feature vector of the biometric data of Alice, the system fails to authenticate. For example, this would happen if the distance between the enrollment vector of Alice and probe vector is greater than the predetermined threshold.
2. Probability of false acceptance, of false acceptance rate (FAR). This is the probability that, given a feature vector of a user other than Alice, the system finds a match with the feature vector of Alice. For example, this would happen if the distance between Alice's enrolment vector and the probe vector of any other user in the database is less than the predetermined threshold.

For a given database of users, the value of FRR and FAR is dependent on the distance threshold explained earlier. Using a smaller distance threshold reduces the FAR but increases the FRR. Using a larger distance threshold reduces the FRR but increases the FAR. By sweeping the distance threshold over a range of values, a curve of FRR versus FAR is obtained. The point on the curve at which FRR equals FAR is called the equal error rate (EER). The goal of a designer of an authentication system is to have the smallest possible EER.

Discriminative Features

In most biometric data extraction algorithms, some features are more useful than others in confirming genuine matches and rejecting false matches. Such features are said to be more "discriminative" because they allow the system to better discriminate between genuine users and imposters. For example, in fingerprint matching, it is found that features based on minutiae points are more discriminative than features based on the ridge wavelengths.

It is desirable to use the most discriminative features while constructing the feature vectors for enrolled users. If the elements of Alice's feature vector are discriminative, the comparison of those elements can result in low FRR and low FAR for Alice. However, the discriminative features often vary from one user to another. Thus, for example, features extracted from the center of the finger may be most discriminative for Alice, but features extracted from the side of the finger may be most discriminative for Bob. Thus it is desirable to use specific discriminative features for a specific user, as contrasted with a common set of discriminative features for all enrolled users in the database.

While discriminative features are useful in improving the FAR versus FRR tradeoff, the discriminative features can present two difficulties in practical system design. First, the discriminative features can only be determined at enrollment when multiple samples from the enrolled persons can be collected, and statistical analysis of these feature vectors is carried out. At the time of authentication, only one feature vector from the querying person is available. Second, the locations of the discriminative features are privacy-sensitive. If an imposter Bob finds out the locations of Alice's discriminative features, Bob can try to synthesize an artificial feature vector using this information.

Consistent Features

The features of the biometric data that do not change substantially from one measurement to another are deemed consistent features. The consistent features are reproducible for measurements acquired over time, and contribute to lower FRR. In some biometric data extraction method employed by embodiments, real-valued or integer-valued signals are compared against a threshold (or a vector of thresholds) to provide a binary or an integer-valued feature. Such extraction method can be advantageous for systems in which the resulting feature vector is encrypted before being stored in a database, or before being sent to the database for authentication. In this case, consistency can depend on the absolute distance between the threshold point(s) and the value of the biometric data. Specifically, the larger the distance, the smaller the probability that the feature is quantized to a different value, and thus the feature is more consistent.

In some embodiments, the consistency of the discriminative features is represented by consistency vector, which is a vector of elements with magnitude proportional to probability that the corresponding element in the feature vector remains unchanged across multiple measurements. Such correlation among elements of the feature and consistent vectors is more difficult to be exploited by an adversary in a secure protocol, unlike the location of the discriminative elements of the biometric data.

By definition, discriminative features are consistent, but consistent features are not necessarily discriminative. In order to be discriminative, a consistent feature in the biometric data must satisfy an additional requirement, i.e., that the value of this feature in the biometric data of the other users is nearly uniformly distributed over its range. For example, if a particular bit extracted from the center of Alice's fingerprint always takes value 0, then the bit is consistent across different measurements provided by Alice, but the bit is discriminative only if the same bit extracted from the center of any other user in the database is equally likely to take the value 0 or 1.

For example, in one embodiment, the vectors x and y are binary and include N bits, and the consistency of each of the bits is obtained during the process of quantizing biometric signal. For example, suppose the $i^{th}$ feature bit of the biometric data of Alice is determined by comparing value of the $i^{th}$ signal extracted from biometric data of Alice against the median of $i^{th}$ signal values extracted from all biometrics used for enrollment and training. In this case, the consistency is a function of the distance between the median and the signal value obtained for Alice. The larger the distance, the smaller is the probability that the feature bit is inconsistent from measurement to measurement. Conversely, the smaller the distance, the larger is the probability that the $i^{th}$ feature bit changes from measurement to measurement.

In one embodiment, the consistency is defined as an integer-valued function of the distance between the value of the $i^{th}$ feature extracted from biometric data of Alice and median of the values of $i^{th}$ feature extracted from all biometrics used in enrollment and training. In various embodiments, the consistency information for up to N features obtained during enrollment and training, is utilized to prevent an adversary to be false authenticated.

To clarify the concept of consistency, consider a simple example, in which the biometric signal obtained from a single user during enrollment is the vector [4, 5, −10, 12, 3]. Suppose that the median value of each element of the signal vector is 4, where the median is measured across all the enrolled users. In that case, the absolute distance of the signal values from the median is [0, 1, 14, 8, 1]. Consider now that the extracted biometric feature vector is binary, and obtained according to the following simple rule: the feature element takes the value 0 if the signal vector element is less than or equal to the median, and takes the value 1 when the signal vector element is higher than the median. With this rule, the feature vector, corresponding to the signal [4,5,−10,12,3] with the median value of 4 for each measurement is [0,1,0,1,0].

However, in the above example, the five bits are not equally consistent. This is because some signal vector elements were close to the median, (e.g., the measurements of value 4, 5, and 3) while other signal vector elements were far from the median (e.g., the measurements of value −10, and 12). This is significant, because biometric signals change slightly from measurement to measurement. Since the first, second and fifth signal vector elements were close to the median, the corresponding bits in the feature vector are not consistent, and they may change from measurement to measurement. In contrast, the third and fourth signal vector elements were far from the median, and the corresponding bits in the feature vector are very consistent because they are unlikely to change from measurement to measurement.

The location of consistent signal vector elements is different for different users. Furthermore, the location of the consistent signal vector element is not necessarily identical to the location of the discriminative elements. This fact is utilized in this invention. In particular, given the feature extraction algorithm, the adversary will be able to take advantage of the discriminative elements, even if he does not know their locations. However, the feature extraction algorithm does not give the adversary information about the consistency of the feature bits. Our proposal is to disallow authentication if the consistency of the feature bits of the person claiming to be an enrolled user differs from the consistency of the feature bits of the legitimately enrolled user by an amount greater than a threshold.

Homomorphic Encryption

Due to increased privacy concerns, the pairwise comparison of biometric data is performed in a secure manner. In some embodiments, to protect the privacy and security of the enrolled users in the database, the computation of the distances between the biometric data presented at authentication and stored in the server are performed in the encrypted domain.

Conventional public key encryption algorithms do not allow encrypted-domain calculation. Homomorphic cryptosystems are special public key cryptosystems that allow simple operations such as addition and/or multiplication in the encrypted domain. Examples of these cryptosystems include additive homomorphic system described by Paillier and Damgard-Jurik, multiplicative homomorphic system described by El Gamal, quadratic homomorphic system described by Boneh et al and fully homomorphic system described by Gentry.

Let an encryption function be denoted by $E(.)$, and let a, b, c and d be four integers. Then, in an additively homomorphic system, such as the Paillier system, $E(a)E(b)=E(a+b)$ and $E(a)^b=E(ab)$.

A quadratic homomorphic system, which uses a homomorphism on quadratic polynomials, allows one multiplication and unlimited number of additions in the encrypted domain. Thus, in the quadratic homomorphic system, if $C_1=E(a)$ and $C_2=E(b)$ then $C_1C_2=E(a)E(b)=E(a+b)$, which means that addition can be performed in the encrypted domain. Further, in a quadratic homomorphic system, there exists a function $e(.,.)$, such that $e(C_1,C_2)=e(E(a),E(b))=F(ab)$, where the function $F(.)$ can be inverted, i.e., decrypted to reveal the product ab. This means that multiplication can be performed in the encrypted domain. An example of the function $e(.,.)$ is a bilinear mapping on multiplicative cyclic groups. The function $F(.)$ is also additively homomorphic and supports an unlimited number of additions. For e.g., $F(ab)F(cd)=F(ab+cd)$. However, the function $F(.)$ is not multiplicatively homomorphic. Thus, given $F(ab)$ and $F(cd)$, it is not possible to obtain $F(abcd)$ using the mapping $e(F(ab),F(cd))$. Examples of such cryptosystems include the scheme for evaluating quadratic polynomials taught by Boneh, Goh and Nissim "Evaluating 2-DNF formulas on Ciphertexts, Theory of Cryptography, pages 325-341, 2005." and another scheme for evaluating 2-DNF (Disjunctive Normal Form) expressions taught by Mitsuhiro Hattori et al., in "Provably-Secure Cancelable Biometrics Using 2-DNF Evaluation, Journal of information processing, vol. 20, no. 2, pp. 496-507, April 2012."

A fully homomorphic system, such as Gentry's system, allows an unlimited number of multiplications and unlimited number of additions in the encrypted domain.

Various embodiments can employ any additive, quadratic or doubly homomorphic system. In the embodiments described below, an implementation with quadratic homomorphic system is used due to its low computational and transmission overhead. However, extensions of the method to additively homomorphic system and doubly homomorphic systems are straightforward.

In the embodiments described below, the distance measure is the square of the Euclidean distance between features of the biometric data is used. However, other embodiment use different distance measures, such as a binary Hamming distance, a weighted hamming distance, and a weighted Euclidean distance.

Setup Phase

In one embodiment, the biometric access control device, database server and authentication server can possess the public-key, e.g., the key 140 of a homomorphic system. Only the authentication server possesses the private key, e.g., the key 145 needed to decrypt ciphertexts.

Figure 2:
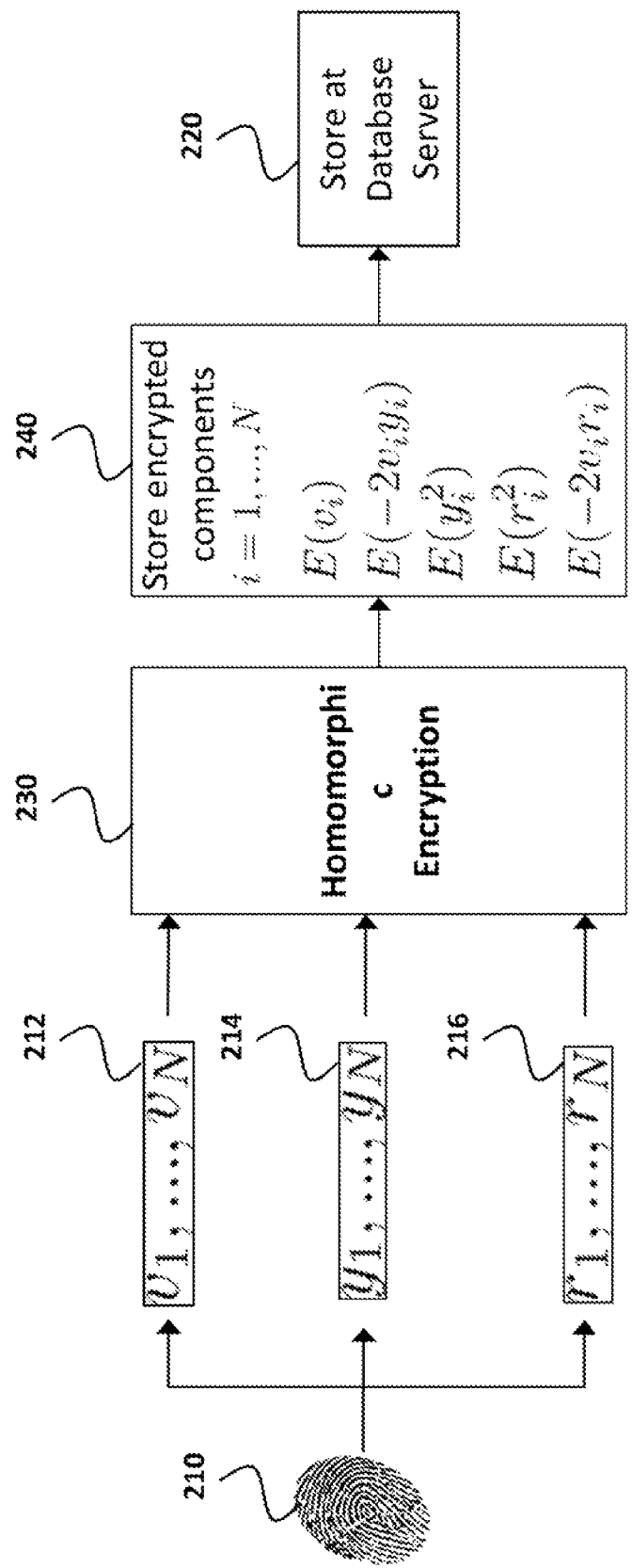
FIG. 2 is a block diagram of method for storing an encryption of biometric data at a server during an enrolment of the user according to an embodiment of the invention.

FIG. 2 shows a block diagram of method for storing an encryption of biometric data at the server 120 during an enrolment state according to an embodiment of the invention. For each biometric data 210 to be enrolled in the biometric authentication system, the database server 120 or a third party service determines an enrolment vector 214, such that elements of the enrolment vector include features of the biometric data 210. Also, an indicator vector 212 specifying positions of discriminative features of the biometric data and a first consistency vector 216 specifying consistency of each element of the enrolment vector are determined. The enrolment vector 214, the indicator vector 212, and the first consistency vector 216 are encrypted 230 with a homomorphic encryption, e.g., quadratic encryption.

In various embodiments, encryptions of the enrolment vector, the indicator vector, and the first consistency vector are stored 220 at the database server 120 for future authentication. In some embodiments, the enrolment vector, the indicator vector, and the first consistency vector are stored in a form of encrypted algebraic components 240 to facilitate subsequent authentication.

For example, in one embodiment, for each user enrolled in the biometric authentication system, the database server stores a first set of algebraic components including $E(v_i)$ and $E(-2v_iy_i)$ and $E(y_i^2)$ where $i=1, 2, \ldots, N$. Similarly, for each user enrolled in the biometric authentication system, the database server stores in the first set $E(v_i)$ and $E(-2v_ir_i)$ and $E(r_i^2)$ where i=1, 2, . . . , N. Storing the enrolment vector, the indicator vector, and the first consistency vector in the form of the encrypted algebraic components allows to determined distance between to encrypted vectors in encrypted domain using homomorphic properties, i.e., without decrypting the vectors.

This embodiment is based on a realization that some distance functions of vectors have specific properties, which facilitate finding a solution of those functions in an encrypted domain. Those distance functions can be transformed into a linear combination of homomorphic components. A homomorphic component is an algebraic combination of inputs, i.e., vectors, such that the encrypted value of the homomorphic component can be calculated directly using homomorphic properties, i.e., without decryption, from the encrypted values of the vectors. Thus, the computation of the encrypted results of the homomorphic components is performed in the encrypted domain preserving the secrecy of the data. An encrypted homomorphic component can be processed using homomorphic properties. Thus, storing the enrolment vector, the indicator vector, and the first consistency vector in the form of the encrypted algebraic components determined based on a specific distance function allows to determine a result of that function in an encrypted domain. One example of using homomorphic encryption for computing a distance function is taught by Hirano et al in Patent Application WO 2012114452 A1, entitled, "Similarity calculation system, similarity calculation device, computer program, and similarity calculation method." An example of the usage of the encrypted algebraic components is provided below.

Figure 3:
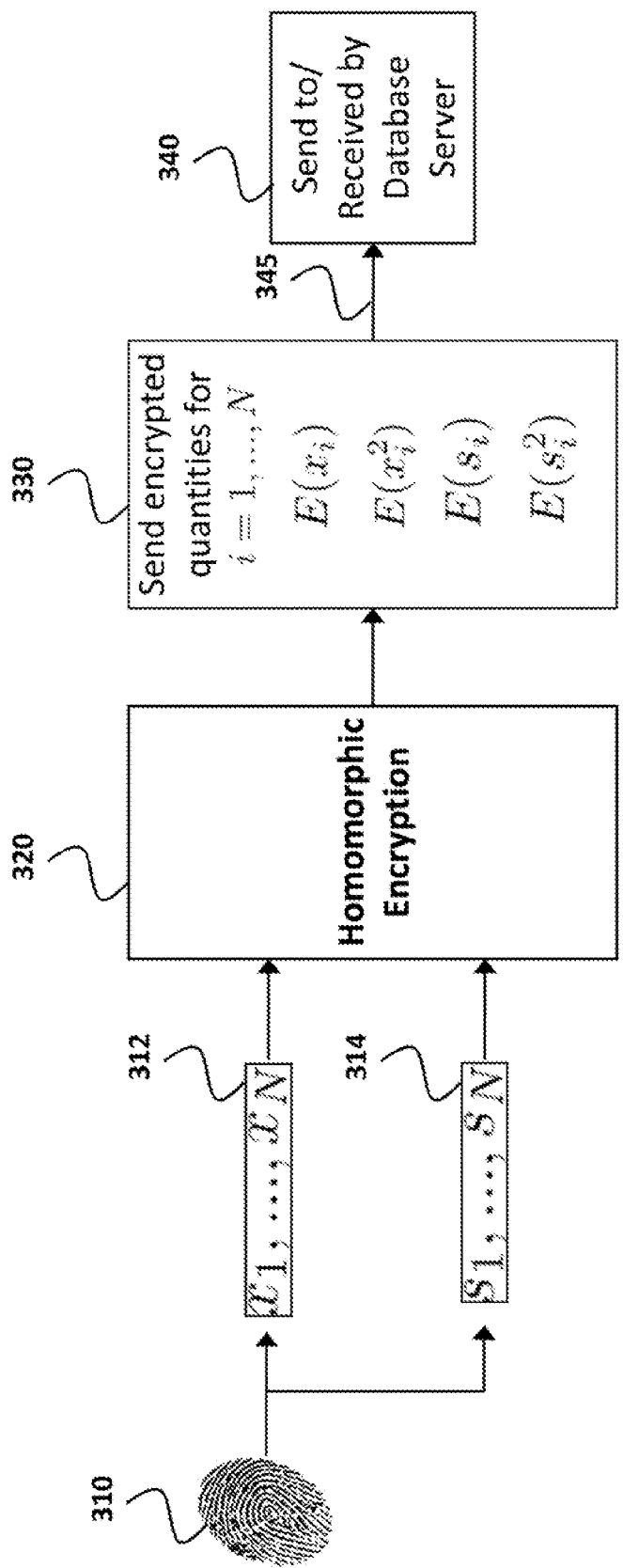
FIG. 3 is a block diagram of method for receiving an encryption of biometric data at the server during an authentication if the biometric data according to an embodiment of the invention.

FIG. 3 shows a block diagram of method for determining an encryption of biometric data during an authentication stage according to an embodiment of the invention. The biometric access control device 110 receives the name of the claimed identity, e.g., "Alice." The access control device then accepts the biometric data, such as a fingerprint 310, from the user or imposter and runs the biometric feature extraction algorithm on that biometric signal. The output of the feature extraction algorithm is a probe vector x 312 and a second consistency vector s 314. Each of these vectors is has length N, the elements of the probe vector include features of the biometric data 310, and $s_i$ represents the consistency of the feature $x_i$ of the probe vector.

In some embodiments, the access control device encrypts 320 the probe vector and the second consistency vector with a homomorphic encryption and transmit 345 the encrypted vectors to the database server 120. Accordingly, the database server receives 340 an encryption of a probe vector presented for an authentication of the biometric data, and an encryption of a second consistency vector specifying consistency of each element of the probe vector.

Similarly to the operation in the database server, the access control device of some embodiments determines 330 and transmits a second set of encrypted algebraic components. For example, in one embodiment, the second set includes $E(x_i^2)$, $E(x_i)$, $E(s_i^2)$ and $E(s_i)$ for i=1, 2, . . . , N.

Figure 4:
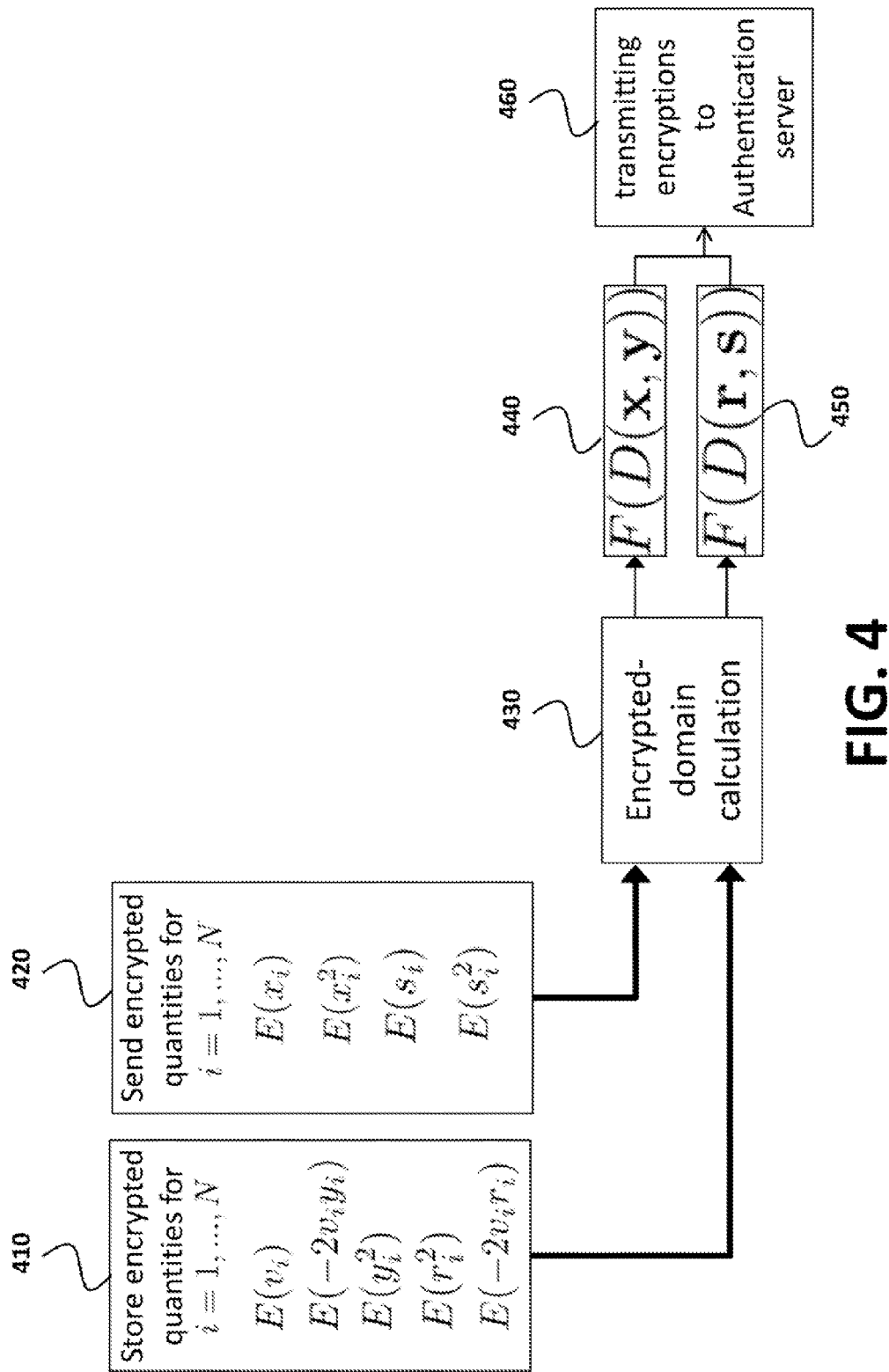
FIG. 4 is a block diagram of method for determining distances between data presented for an authentication and data stored at the server according to an embodiment of the invention.

FIG. 4 shows a block diagram of method for determining distances between data presented for an authentication 420 and data 410 stored at the server. In some embodiments, the data 410 stored at the server during an enrollment process include an encryption of an enrolment vector, wherein elements of the enrolment vector include features of the biometric data, and an encryption of an indicator vector specifying positions of discriminative features of the biometric data, as described above. Also, the data 420 received by the server during the authentication include an encryption of a probe vector presented for an authentication of the biometric data, and an encryption of a second consistency vector specifying consistency of each element of the probe vector.

The server determines 430, in an encrypted domain, an encryption of a first distance 440 between discriminative elements of the enrolment and the probe vectors, wherein positions of the discriminative elements of the enrolment and the probe vectors correspond to the positions of the discriminative features of the user specified by the indicator vector. Similarly, the server determines 430, in the encrypted domain, an encryption of a second distance 450 between discriminative elements of the first and the second consistency vectors, wherein positions of the discriminative elements of the first and the second consistency vectors correspond to the positions of the features of the user specified by the indicator vector.

In various embodiments, the biometric data is authenticated based on the first and the second distances. For example, the authenticating can include transmitting 460 the encryptions of the first and the second distance to the authentication server 130.

In some embodiments, the enrolment vector, the probe vector, the indicator vector, the first consistency vector, and the second consistency vector are encrypted with a public key of a homomorphic encryption. In these embodiments, the encryptions of the first and the second distance are determined in the encryption domain using the homomorphic properties.

Figure 5:
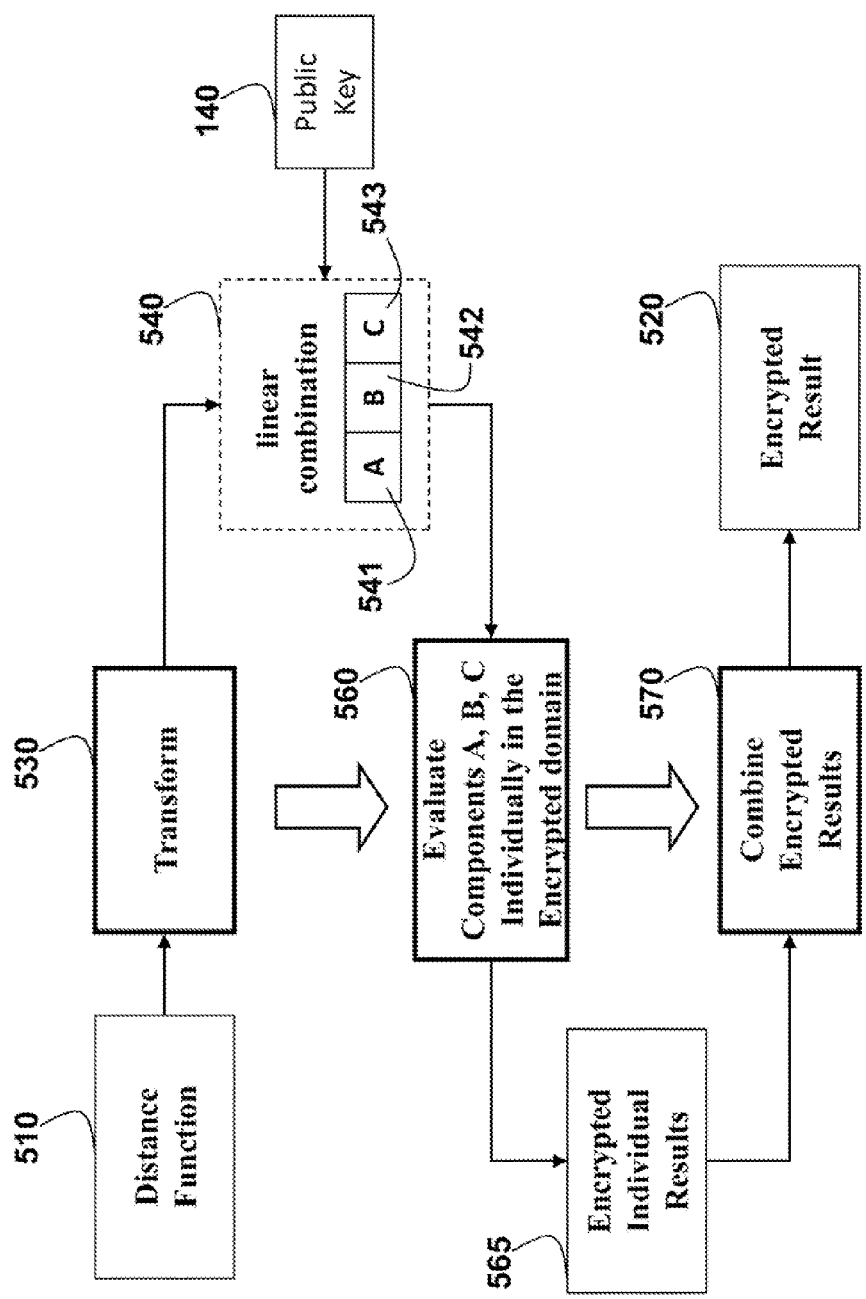
FIG. 5 is a diagram of a method for securely determining an encrypted result of a distance function expressed as a linear combination of homomorphic components according to an embodiment of the invention.

FIG. 5 shows a diagram of a method for securely determining an encrypted result 520 of a distance function 510 expressed 530 as a linear combination of homomorphic components 540. The encrypted result 520 can be the first 440 or the second 450 distances determined in the encrypted domain. The encrypted result can be securely communicated and decrypted with a private key 145 associated with the public key 140.

The embodiments of the invention transform 530 the distance function 510 into a linear combination 540 of homomorphic components, e.g., 541, 542, and 543. Examples of the linear combination are addition and subtraction of the homomorphic components. The homomorphic components are encrypted with a public key 140. The encrypted results of the homomorphic components can be evaluated 560 individually, e.g., using the properties of the homomorphic encryption. Because of the properties of the homomorphic encryption and linear combination, encrypted individual results 565 can be combined 570 to produce the final encrypted result 520 of the function.

For example, the database server 120 can store the first set of algebraic combinations of encryptions of the enrolment vector, the indicator vector, and the first consistency vector. The first set can be determined according to the distance function to facilitate subsequent computation in the encrypted domain.

For example, in one embodiment, the distance function is an Euclidean distance, and the first set of algebraic combinations includes $E(v_i)$, $E(-2v_iy_i)$, $E(y_i^2)$, $E(-2v_ir_i)$ and $E(r_i^2)$, where i=1, 2, . . . N, E(.) is an encryption function of the quadratic homomorphism, $y=(y_1, y_2, \ldots, y_N)$ is the enrolment vector, $v=(v_1, v_2, \ldots, v_N)$ is the indicator vector, $r=(r_1, r_2, \ldots, r_N)$ is the first consistency vector.

During the authentication, the database server receives a second set of algebraic combinations of encryptions of the probe vector and the second consistency vector. For example, in the embodiment with the Euclidean distance function, the server can receive the second set of algebraic combinations including $E(x_i^2)$, $E(x_i)$, $E(s_i^2)$ and $E(s_i)$, wherein $x=(x_1, x_2, \ldots, x_N)$ is the probe vector, and $s=(s_1, s_2, \ldots, s_N)$ is the second consistency vector.

The server evaluates and combines encrypted results to determine the encryption $F(D(x, y))$ of the first distance 440 according to $$\prod_{i=1}^{N} F(v_i x_i^2) F(-2v_i x_i y_i) F(v_i y_i^2) =$$

$$\prod_{i=1}^{N} F(v_i x_i^2 - 2v_i x_i y_i + v_i y_i^2) = F\left(\sum_{i=1}^{n} v_i x_i^2 - 2v_i x_i y_i + v_i y_i^2\right) = F(D(x, y)),$$

wherein $e(E(v_i), E(x_i^2)) = F(v_i x_i^2)$, $e(E(-2v_i y_i), E(x_i)) = F(-2v_i x_i y_i)$, and $e(E(v_i), E(y_i^2)) = F(v_i y_i^2)$, wherein $e(.,.)$ is a function of quadratic homomorphism producing an invertible function $F(.)$ of a product of two encrypted parameters of the function $e(.,.)$. Note that $F(.)$ can be inverted only in the presence of an appropriate decryption key.

Similarly, the server determines the encryption $F(D(r, s))$ of the second distance 450

$D(r, s) = \sum_{i=1}^{N} v_i (r_i - s_i)^2$ according to the following expressions:

$$\prod_{i=1}^{N} F(v_i r_i^2) F(-2v_i r_i s_i) F(v_i s_i^2) =$$

$$\prod_{i=1}^{N} F(v_i r_i^2 - 2v_i r_i s_i + v_i s_i^2) = F\left(\sum_{i=1}^{N} v_i r_i^2 - 2v_i r_i s_i + v_i s_i^2\right) = F(D(r, s))$$

wherein $e(E(v_i), E(r_i^2)) = F(v_i r_i^2)$, $e(E(-2v_i s_i), E(r_i)) = F(-2v_i r_i s_i)$ and $e(E(v_i), E(s_i^2)) = F(v_i s_i^2)$, wherein $e(.,.)$ is a function of quadratic homomorphism producing an invertible function $F(.)$ of a product of two encrypted parameters of the function $e(.,.)$. As before, note that $F(.)$ can be inverted only in the presence of an appropriate decryption key.

In one embodiment, the distance function between the consistency vectors is the same as that used for the biometric features x and y. In other embodiments, this distance function is different, such as a Hamming distance, an absolute distance, a weighted squared distance. The encryption of the first and the second distances can be decrypted or transmitted to the authentication server for the decryption.

FIG. 6 is a block diagram of method for authenticating the biometric data performed by an authentication server 130 according to one embodiment of the invention. The authentication server 130 receives encrypted distances $F(D(x, y))$ 440 and $F(D(r, s))$ 450, decrypts the first and the second distances and compares the first and the second distances with thresholds. In some embodiments, the authentication server determines a positive authentication if the first distance is less than the first threshold and the second distance is less than the second threshold.

For example, the authentication server decrypts 610 the first distance $F(D(x, y))$ and compares 630 the decrypted first distance $D(x, y)$ 620 with a first threshold. If the distance $D(x, y)$ 620 exceeds the first threshold, the authentication server reports authentication failure 640. If $D(x,y)$ is below the first threshold, the authentication server decrypts 615 the second distance $F(D(r, s))$ and compares 635 the decrypted second distance $D(r, $ 625 against a second threshold. If $D(r, s)$ exceeds the second threshold, the authentication server reports authentication failure 640. If the unencrypted second distance $D(r, s)$ is below the second threshold, then the authentication server reports 650 that the claimed identity has been authenticated. Other Advantage of Exploitation of Discriminative Features Generally, it is not advisable to openly and publically store the locations of the discriminable features. An adversary who discovers the locations, e.g., positions, of discriminative features of biometrical data of Alice, can use this information to be authenticated as Alice. Therefore, in various embodiments, the positions of the discriminable features, provided in the indicator vector v, are encrypted.

In some situations, the encryption of the indicator vector is not entirely secure. Even though the adversary cannot know the positions of the discriminable features, these positions are used by some embodiments to determine the distance function. For example, for any vector provided by the adversary, x, it is certain that only those elements with positions specified by the indicator vector are used in the distance calculation. Thus, if an adversary generates feature values close enough to Alice's feature values for a large enough number of elements, then the adversary can still falsely impersonate Alice.

To prevent the above situation, the embodiments utilize the consistency of the discriminative features. Some embodiments are based on the following observation. By definition, if the $i^{th}$ biometric feature, i.e., the feature corresponding to the $i^{th}$ element extracted from the biometric data of Alice is discriminable, then that the $i^{th}$ biometric feature can be reproduced in multiple measurements of the biometric data of Alice, and have a nearly uniform distribution over its range of values in measurements of most imposters. This means that the consistency $r_i$ of the $i^{th}$ biometric feature for Alice is larger than the consistency of the $i^{th}$ biometric feature for most imposters. Therefore, the distance in consistency can be exploited to prevent the adversary from gaining access.

In various embodiments, the consistency of the $i^{th}$ biometric feature of Alice (and every enrolled user) is stored in the encrypted form on the database server. The consistency of the $i^{th}$ biometric feature, denoted by $s_i$, for any individual presenting their biometric at the access control device is available to the access control device. This is because the access control device has access to the distribution of the values of the $i^{th}$ biometric feature from its training data. As an example, if the median is used to threshold the value of the $i^{th}$ biometric feature to $x_i=0$ then the access control device stores the median values of the $i^{th}$ biometric feature that obtained, e.g., during the enrollment.

Thus, in various embodiments, in addition to the probe vector x, the access control device also transmits the consistency vector s to the server. The server, in addition to determining the distance between x and y in the encrypted domain, determines a distance measure between r and s in the encrypted domain.

For single-factor authentication systems in the art, authentication succeeds if the distance between x and y is below a threshold. In contrast, in the some embodiment, this test is not sufficient. If the distance between x and y is small enough, then the authentication server decrypts the distance between r and s, the consistency vectors of the claimed identity and the provided biometric. Only if this second distance is also below a second threshold is access granted. Advantageously, the embodiments use various kinds of information to limit the adversary's ability to exploit the discriminable bits of an enrolled user.

Some embodiments use the authentication where one submitted feature vector is authenticated against one stored feature vector. However, alternative embodiments extend to a "identification" scenario, in which one submitted feature vector is compared against multiple stored feature vectors having discriminative elements at different positions.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium or multiple computer readable media, e.g., a computer memory, compact discs (CD), optical discs, digital video disks (DVD), magnetic tapes, and flash memories. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, and data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for authenticating an encryption of biometric data, comprising a processor for performing steps of the method, comprising the steps of:
    storing an encryption of an enrolment vector, wherein elements of the enrolment vector include features of the biometric data;
    storing an encryption of an indicator vector specifying positions of discriminative features of the biometric data;
    storing an encryption of a first consistency vector of elements with magnitude proportional to probability that corresponding elements in the enrolment vector remain unchanged across multiple measurements;
    receiving an encryption of a probe vector presented for an authentication of the biometric data;
    receiving an encryption of a second consistency vector of elements with magnitude proportional to probability that corresponding elements in the probe vector remain unchanged across multiple measurements;
    determining, in an encrypted domain, an encryption of a first distance between discriminative elements of the enrolment and the probe vectors, wherein positions of the discriminative elements of the enrolment and the probe vectors correspond to the positions of the discriminative features of the user specified by the indicator vector;
    determining, in the encrypted domain, an encryption of a second distance between discriminative elements of the first and the second consistency vectors, wherein positions of the discriminative elements of the first and the second consistency vectors correspond to the positions of the features of the user specified by the indicator vector; and
    authenticating the biometric data based on the first and the second distances.

2. The method of claim 1, wherein the authenticating comprises:
    transmitting the encryptions of the first and the second distance to an authentication server.

3. The method of claim 1, wherein the authenticating comprises:
    comparing the first distance with a first threshold;
    comparing the second distance with a second threshold; and determining a positive authentication if the first distance is less than the first threshold and the second distance is less than the second threshold.

4. The method of claim 1, further comprising:
decrypting the first and the second distances.

5. The method of claim 1, wherein the authenticating comprises:
transmitting the encryptions of the first and the second distances to an authentication server;
decrypting, by the authentication server, the first and the second distances; and
determining, by the authentication server, a positive authentication, if the first distance is less than a first threshold and the second distance is less than a second threshold.

6. The method of claim 1, wherein the enrolment vector, the probe vector, the indicator vector, the first consistency vector, and the second consistency vector are encrypted with a public key of a homomorphic encryption, further comprising:
determining the encryptions of the first and the second distance in the encryption domain using homomorphic properties.

7. The method of claim 1, wherein the first and the second distances are determined according to a distance function expressed as a linear combination of homomorphic components, further comprising:
storing a first set of algebraic combinations of encryptions of the enrolment vector, the indicator vector, and the first consistency vector;
receiving a second set of algebraic combinations of encryptions of the probe vector and the second consistency vector;
combining the algebraic combinations of the first and the second set to produce a first linear combination of homomorphic components of the first distance and a second linear combination of homomorphic components of the second distance, wherein the combining is performed in the encrypted domain using homomorphic properties;
combining the homomorphic components of the first linear combinations to produce the encryption the first distance; and
combining the homomorphic components of the second linear combinations to produce the encryption the second distance.

8. The method of claim 7, wherein the first set of algebraic combinations includes $E(v_i)$, $E(-2v_iy_i)$, $E(y_i^2)$, $E(-2v_ir_i)$ and $E(r_i^2)$, where $i=1, 2, \ldots N$, $E(.)$ is an encryption function of the quadratic homomorphism, $y=(y_1, y_2, \ldots, y_N)$ is the enrolment vector, $v=(v_1, v_2, \ldots, v_N)$ is the indicator vector, $r=(r_1, r_2, \ldots, r_N)$ is the first consistency vector, and wherein the second set of algebraic combinations includes $E(x_1^2)$, $E(x_1)$, $E(s_1^2)$ and $E(s_1)$, wherein $x=(x_1, x_2, \ldots, x_N)$ is the probe vector, and $s=(s_1, s_2, \ldots, s_N)$ is the second consistency vector, further comprising:
determining the encryption of the first distance $$D(x, y) = \sum_{i=1}^{N} v_i(x_i - y_i)^2$$

according to $\Pi_{i=1}^{N} F(v_i x_i^2) F(-2v_i x_i y_i) F(v_i y_i^2) = \Pi_{i=1}^{N} F(v_i x_i^2 - 2v_i x_i y_i + v_i y_i^2) = F(\Sigma_{i=1}^{n} v_i x_i^2 - 2v_i x_i y_i + v_i y_i^2) = F(D(x, y))$,
wherein $e(E(v_i), E(x_i^2)) = F(v_i x_i^2)$, $e(E(-2v_i y_i), E(x_i)) = F(-2v_i x_i y_i)$, and $e(E(v_i), F(y_i^2)) = F(v_i y_i^2)$,
wherein $e(.,.)$ is a function of quadratic homomorphism producing an invertible function $F(.)$ of a product of two encrypted parameters of the function $e(.,.)$;
determining the encryption of the second distance $D(r,s) = \Sigma_{i=1}^{N} v_i(r_i - s_i)^2$ according to $$\prod_{i=1}^{N} F(v_i r_i^2) F(-2v_i r_i s_i) F(v_i s_i^2) = \prod_{i=1}^{N} F(v_i r_i^2 - 2v_i r_i s_i + v_i s_i^2) = F\left(\sum_{i=1}^{N} v_i r_i^2 - 2v_i r_i s_i + v_i s_i^2\right) = F(D(r, s))$$

wherein $e(E(v_i), E(r_i^2)) = F(v_i r_i^2)$, $e(E(-2v_i s_i), E(r_i)) = F(-2v_i r_i s_i)$ and $e(E(v_i), E(s_i^2)) = F(v_i s_i^2)$.

9. A system for authenticating biometric data of a user, comprising:
a database server for determining, in an encrypted domain, an encryption of a first distance between discriminative elements of an enrolment vector stored at the server and a probe vector presented for an authentication, and for determining, in the encrypted domain, an encryption of a second distance between discriminative elements of a first consistency vector stored at the server and a second consistency vector presented for the authentication;
an access control device for determining an encryption of the probe vector and an encryption of the second consistency vector, and for transmitting the encryptions of the probe vector the second consistency vector to the database server; and
an authentication server for decrypting the encryptions of the first and the second distances received from the database server, and for authenticating the biometric data based on a comparison of the first and the second distances with at least one threshold, wherein the database server stores an encryption of the enrolment vector, wherein elements of the enrolment vector include features of the biometric data, stores an encryption of an indicator vector specifying positions of the discriminative elements of the enrolment vector, and stores an encryption of the first consistency vector specifying consistency of each element of the enrolment vector.

* * * * *